(12) United States Patent
Shoji et al.

(10) Patent No.: US 7,775,698 B2
(45) Date of Patent: Aug. 17, 2010

(54) VEHICLE LAMP

(75) Inventors: Hideyasu Shoji, Tokyo (JP); Ichiro Yoshio, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 246 days.

(21) Appl. No.: 12/136,171

(22) Filed: Jun. 10, 2008

(65) Prior Publication Data
US 2008/0310180 A1 Dec. 18, 2008

(30) Foreign Application Priority Data
Jun. 15, 2007 (JP) .............................. 2007-158913

(51) Int. Cl.
*B60Q 1/06* (2006.01)
(52) U.S. Cl. ........................ 362/538; 362/539; 362/516; 362/507; 362/459
(58) Field of Classification Search ................. 362/459, 362/487, 507, 539, 538, 516
See application file for complete search history.

(56) References Cited

U.S. PATENT DOCUMENTS

| | | | |
|---|---|---|---|
| 5,636,917 A | 6/1997 | Furami et al. | |
| 7,416,323 B2 * | 8/2008 | Okada et al. | 362/538 |
| 7,470,050 B2 * | 12/2008 | Futami | 362/514 |
| 7,597,465 B2 * | 10/2009 | Inaba et al. | 362/538 |
| 7,654,714 B2 * | 2/2010 | Mochizuki et al. | 362/539 |

FOREIGN PATENT DOCUMENTS

| | | |
|---|---|---|
| JP | 5-66806 | 9/1993 |
| JP | 7326203 | 12/1995 |
| JP | 2006107955 | 4/2006 |
| JP | 2006294380 | 10/2006 |

\* cited by examiner

*Primary Examiner*—Anabel M Ton
(74) *Attorney, Agent, or Firm*—Kenealy Vaidya LLP

(57) ABSTRACT

A vehicle lamp including a projector headlight for a low beam can include a light source, an ellipsoidal reflector, a projector and shade. Light emitted from the light source can form a fundamental light distribution pattern from the projector lens via the ellipsoidal reflector by shielding an upwards portion of the light with the shade. The shade can form respective thin blurred parts on and/or underneath a horizontal cut-off line for both a driving lane portion and an oncoming lane portion using a top edge line and a top surface of the shade. Therefore, a contrasting difference between the upper and lower sides of the horizontal cut-off line can be reduced so as to be able to conform to a light distribution standard for a headlight. Adjustment of the light distribution pattern can be facilitated due to tonal difference between the horizontal cut-off line of the driving lane and the oncoming lane.

20 Claims, 17 Drawing Sheets

Fig. 8 (A)
Fig. 8 (B)
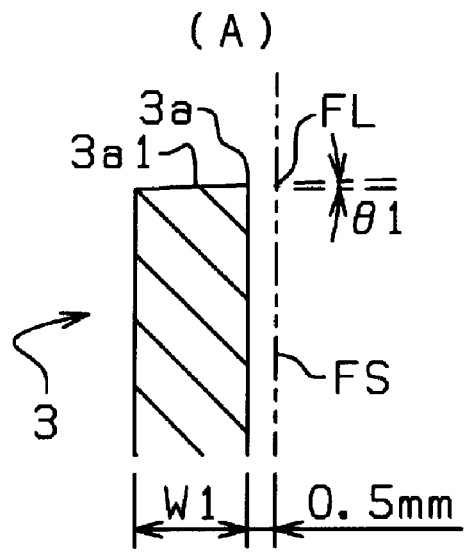
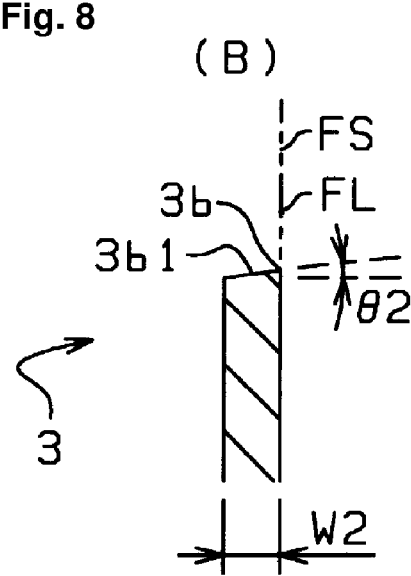
Fig. 9
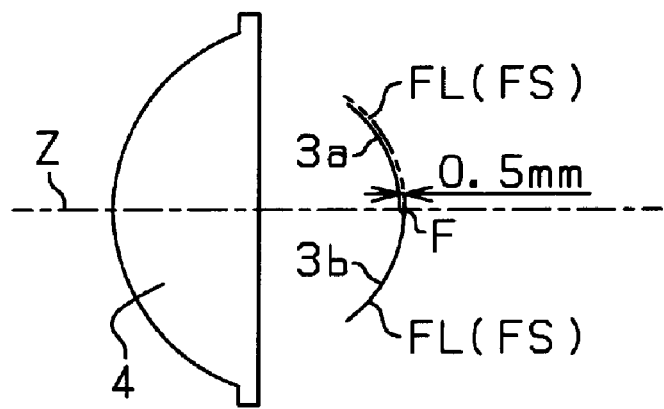

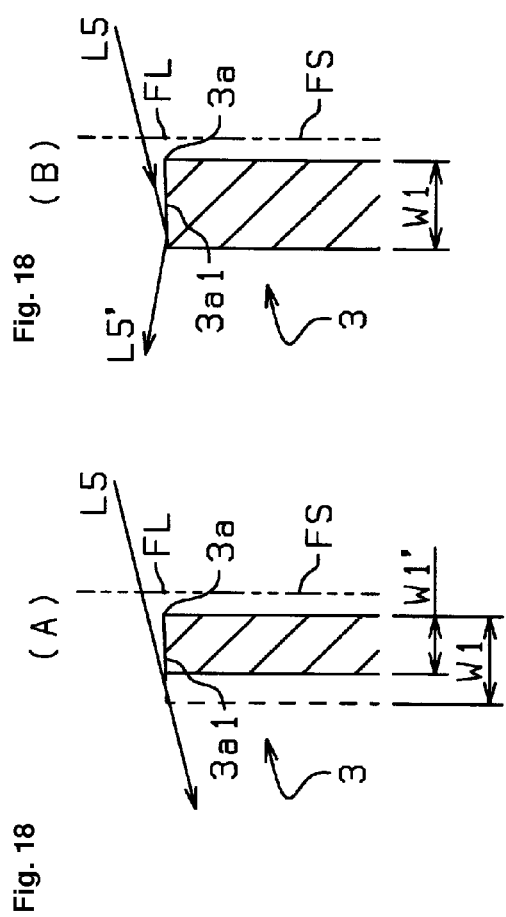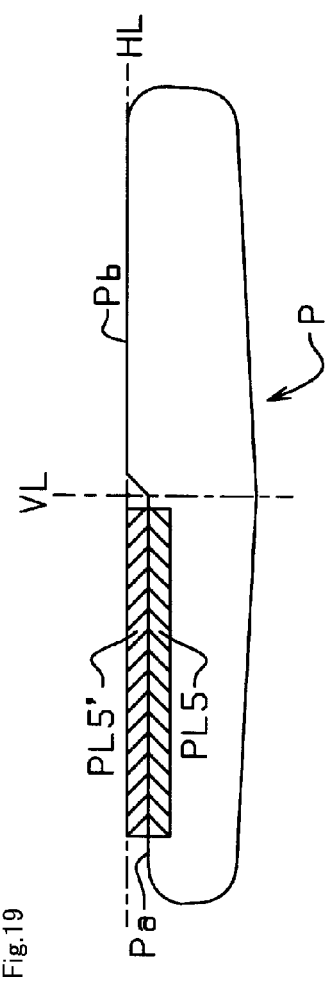

VEHICLE LAMP

This application claims the priority benefit under 35 U.S.C. §119 of Japanese Patent Application No. 2007-158913 filed on Jun. 15, 2007, which is hereby incorporated in its entirety by reference.

BACKGROUND

1. Field

The presently disclosed subject matter relates to a vehicle lamp including a projector headlight for a low beam, and more particularly to a vehicle lamp including a projector headlight having a favorable light distribution pattern that can conform to a light distribution standard for a headlight with respect to a contrasting difference between the upper and lower sides of a horizontal cut-off line in the light distribution pattern.

2. Description of the Related Art

A projector headlight for a low beam and/or a high beam is frequently incorporated into a vehicle lamp including a position lamp, a turn-signal lamp, etc. The projector headlight may allow a light-emitting area thereof to be reduced and therefore allows the vehicle lamp including the projector headlight to be minimized in comparison with other type headlights.

A conventional projector headlight for a low beam is disclosed in patent document No. 1 (Japanese Patent No. 2696745). FIG. 20(A) is a perspective exploded diagram depicting a structure of a conventional projector headlight disclosed in patent document No. 1 and FIG. 20(B) is a schematic diagram showing a fundamental light distribution pattern of the conventional projector headlight when drivers keep to the right side of the road.

According to the conventional projector headlight 20 shown in FIG. 20(A), the projector headlight 20 includes: a light source 21; an elliptical reflector 22 in which a first focus thereof is located near the light source 21; a projector lens 24 which has a focus thereof located near a second focus of the elliptical reflector 22; and a shade 23 located near the focus of the projector lens 24. Thus, an optical axis Z20 approximately corresponds with the respective optical axes of the light source 21, the elliptical reflector 22 and the projector lens 24.

The above-described shade 23 can be configured to include a top surface thereof that substantially corresponds to a horizontal focus curve of the projector lens 24, which intersects the optical axis Z20 at the focus of the projector lens 24. The horizontal focus curve is a horizontal line connecting a number of focus points that allow the projector lens 24 to emit parallel rays. More specifically, FIG. 21 is a schematic cross-section top view depicting the horizontal focus curve FL in relation to the parallel rays emitted from the projector lens 24 via the elliptical reflector 22.

FIG. 21(A) shows a focus F20 emitting the parallel rays to the optical axis Z20 via the projector lens 24 using rays gathered from the range of a radiated angle α of the elliptical reflector 23 to the focus F20 of the projector lens 24 on a horizontal surface including the optical axis Z20. FIGS. 21(B), (C), (D) and (E) show focus F21, F22, F23 and F24 emitting the parallel rays at 10, 20, 30 and 40 degrees to the optical axis Z20, respectively. Actually, the horizontal focus curve FL can be configured to connect the above-described F20-F40 at finer angles.

In the projector headlight 20, a part of the light emitted from the light source 21 directly passes through the projector lens 24 and another part of the light indirectly passes through the projector lens 24 via the elliptical reflector 22. In this case, because the shade 23 can shield upward light, the projector headlight 20 can form the light distribution pattern as shown in FIG. 20(B). In addition, because light reflected at an arbitrary position of the elliptical reflector 22 can be directed in a voluntary direction towards the projector lens 24, a flexible formation of the elliptical reflector 22 may expand on the possibilities for exterior design and appearance as well as possibly expanding the light distribution pattern of the projector headlight 20.

However, because the shade 23 is substantially located along the focus curve FL of the projector lens 24, a contrasting difference between the upper and lower sides of a horizontal cut-off line Pa20 of an oncoming lane and Pb20 of a driving lane in the fundamental light distribution pattern P20 shown in FIG. 20(B) tends to become too clear. When the light-emitting area of the projector headlight 20 becomes smaller and/or the brightness thereof becomes brighter using a high power of light source and the like, the contrasting difference may be especially enhanced and too clear.

Thus, the projector headlight 20 may include a problem in that the excessive contrasting difference thereof causes a decrease of visibility in some cases. In addition, because a contrasting difference between the horizontal cut-off line Pa20 and Pb20 is small, the projector headlight 20 may also include another problem in that the light distribution pattern P20 thereof may be less easily adjusted, especially in a horizontal direction.

The disclosed subject matter relates to a vehicle lamp including a projector headlight for a low beam that addresses and attempts to solve the above-described and other problems characteristics and features. More specifically, the contrasting difference between the upper and lower sides of the horizontal cut-off line Pa20-Pb20 can be reduced so as to conform to a light distribution standard for a headlight. In addition, the contrasting and tonal differences between the horizontal cut-off line Pa20 and Pb20 can become clear and the adjustment of the light distribution pattern can become easy.

Other conventional projector headlights using a top surface of a shade are disclosed in, for instance, patent document No. 2 (Japanese Utility Model Patent Application Laid Open H05-66806), patent document No. 3 (Japanese Patent Application Laid Open JP2006-107955), patent document No. 4 (Japanese Patent Application Laid Open JP2006-294380), etc.

FIG. 22 is a schematic side cross-section view depicting a first conventional projection headlight using a top surface of a shade according to patent document No. 2. The basic structure of the projector headlight 30 shown in FIG. 22 is similar to that of patent document No. 1 shown in FIG. 20(A). However, the shade 33 which includes a flat reflex plate thereon is different from that of patent document No. 1. The shade 33 can create an upward light by reflecting light emitted from a light source 31 via a reflector 32 on the flat reflex plate thereof.

Thus, because the upward light can illuminate above the horizontal cut-off line via a projector lens 34, it can be easy to confirm the presence of a traffic sign and the like located above the light distribution pattern of the projector headlight 30. However, the contrasting difference between the upper and lower sides of the horizontal cut-off line cannot be reduced and the contrasting difference between the horizontal cut-off line Pa20 and Pb20 may also not be clear.

FIG. 23(A) is a schematic side cross-section view depicting a second conventional projection headlight using a top surface of a shade according to patent document No. 3 and FIG. 23(B) is a schematic diagram showing a fundamental light distribution pattern for driving on the left side formed by the headlight of FIG. 23(B). The basic structure of the projector headlight 40 shown in FIG. 23(A) can be similar to that of patent document No. 1 shown in FIG. 20(A). However, the projector headlight 40 that includes a secondary reflector 43 in place of a shade is essentially different from the structure of headlight of patent document No. 1.

Because the secondary reflector 43 slopes down in a direction towards the projector lens 44, the projector headlight 40 can emit a downward light L40 via a projector lens 44 by reflecting light emitted from light source 41 via reflector 42 on the secondary reflector 43. Thus, when a non high-brightness chip such as a single LED chip is used as the light source 41, the projector headlight 40 can form a hot zone H40 (the brightest portion) using the downward light L40 in a light distribution pattern P40 shown in FIG. 23(B).

Thus, the structure disclosed in patent document No. 3 may be useful when using an LED chip and the like as the light source 41. However, the contrasting difference between the upper and lower sides of a horizontal cut-off line Pa40-Pb40 may not be able to be reduced and the contrasting difference between the horizontal cut-off line Pa40 and Pb40 may not become clear.

FIG. 24(A) is a schematic side cross-section view depicting another conventional projection headlight using a top surface of a shade according to patent document No. 4 and FIG. 24(B) is a schematic diagram showing a fundamental light distribution pattern for driving on the left side formed by the headlight of FIG. 24(A). The basic structure of the projector headlight 50 shown in FIG. 24(A) is also similar to that of patent document No. 1 shown in FIG. 20(A). However, the projector headlight 50 that includes a top flat surface of a shade 53 is essentially different from that of patent document No. 1 for several reasons as set forth below.

Because the top flat surface of the shade 53 includes a flat reflector located at a position closer in direction towards a reflector 52 than a focus of a projector lens 54, the projector headlight 50 can emit an upward light L50 by reflecting light emitted from light source 51 via the reflector 52 on the flat reflector of the shade 53. Thus, the projector headlight 50 can gather the upward light L50 via the projector lens 54 at a bright zone H50 underneath a horizontal cut-off line Pa50-Pb50 in a light distribution pattern P50 shown in FIG. 24(B).

Therefore, the structure disclosed in patent document No. 4 may be useful with respect to light efficiency. However, the contrasting difference between the upper and lower sides of the horizontal cut-off line Pa50-Pb50 is generally not reduced but rather increased, and the contrasting difference between the horizontal cut-off line Pa50 and Pb50 may not become clear.

The above-referenced Patent Documents are listed below.
1. Patent document No. 1: Japanese Patent No. 2696745
2. Patent document No. 2: Japanese Utility Model Patent Application Laid Open H05-66806
3. Patent document No. 3: Japanese Patent Application Laid Open JP2006-107955
4. Patent document No. 4: Japanese Patent Application Laid Open JP2006-294380

The disclosed subject matter has been devised to consider the above and other problems, characteristics and features. Thus, an embodiment of the disclosed subject matter can include a vehicle lamp including a projector headlight for a low beam having a favorable light distribution pattern that can conform to a light distribution standard headlights with respect to a contrast difference between the upper and lower sides of a horizontal cut-off line. In this case, if the horizontal cut-off line has a continuous blur portion, the adjustment of the light distribution pattern may become difficult after the projector headlight is attached to a vehicle lamp and the like. However, according to one aspect of the disclosed subject matter, a vehicle lamp projector headlight can have a light distribution pattern that is easily adjusted.

SUMMARY

The presently disclosed subject matter has been devised in view of the above and other characteristics, desires, and problems in the conventional art, and to make certain changes to existing projector headlights. Thus, an aspect of the disclosed subject matter includes providing a projector headlight for a low beam having a favorable light distribution pattern that can conform to a light distribution standard for headlights with respect to a contrast difference between the upper and lower sides of a horizontal cut-off line. Another aspect of the disclosed subject matter includes providing vehicle lamps including a projector headlight wherein the adjustment of the light distribution pattern can be easier than that of conventional projector headlights.

According to another aspect of the disclosed subject matter, a projector headlight can include a light source, at least one ellipsoidal reflector, a projector lens and a shade. At least the ellipsoidal reflector can have a first focus and a second focus, the first focus thereof being located near the light source. The projector lens can have both a focus and an optical axis thereof located substantially on a line connecting the first focus and the second focus of at least the one ellipsoidal reflector. The shade can comprise both a top edge line including a neutral point and a top surface including the top edge line and can have a neutral point located near the focus of the projector. The top edge line can be configured to form a horizontal cut-off line with light emitted from the light source, and the top surface can be configured to slant down in a direction towards the projector lens. A slant angle of the top surface including the top edge line can be configured to form the horizontal cut-off line of a driving lane that is larger than the horizontal cut-off line of an oncoming lane that is also formed by the slant angle of the top surface including the top edge line.

In the above-described exemplary projector headlight, the light emitted from the light source can form a fundamental light distribution pattern from the projector lens via the ellipsoidal reflector by shielding an upwardly directed light with the shade. In this case, because light that is reflected on the top surface of the portion of the edge line that forms the horizontal cut-off line for the oncoming lane can illuminate a position on the horizontal cut-off line of the oncoming lane, a position underneath the horizontal cut-off line for the oncoming lane can become dark. Accordingly, contrast difference between the upper and lower sides of the horizontal cut-off line for the oncoming lane can be reduced. On the other hand, the top surface forming the horizontal cut-off line for the driving lane can similarly provide the same effect underneath the horizontal cut-off line for the driving lane, because the slant angle can be larger than that of the top surface forming the horizontal cut-off line for the oncoming lane. Thus, the horizontal cut-off line of the oncoming lane can include a thin blur part and the horizontal cut-off line for the driving lane can include a thinner and less blurred (more clear) part than that of the oncoming lane.

In this case, a thickness of the top surface forming the horizontal cut-off line of the driving lane can be thinner than a thickness of the top surface forming the horizontal cut-off line for the oncoming lane. Each point on the top edge line forming the horizontal cut-off line of the oncoming lane can be closer to the projector lens than each symmetrical point on the top edge line forming the horizontal cut-off line for the driving lane based on neutral point. The above-described structure can enhance the effect of the lamp and can provide for adjustment of thickness, brightness and the like of the blur part.

In the above-described exemplary projector headlight, the top edge line corresponds to substantially a horizontal focus curve intersecting with the optical axis at the focus of the projector lens. In this case, the top edge line forming the horizontal cut-off line for the oncoming lane can be nearer to the projector lens than the horizontal focus curve. The above-described structure can enhance the effect of the lamp and can provide for finely adjusting a thickness, brightness and the like of the blur part while expanding on the design possibilities thereof.

According to another aspect of the disclosed subject matter, a vehicle lamp including the projector headlight can further include a housing, a fulcrum point, screws and an outer lens. The fulcrum point can be configured to have the projector headlight revolved using the housing as a basis. The screws can be configured to have the projector headlight revolved in both a horizontal direction and a vertical direction of the optical axis to the fulcrum point. The outer lens can be attached to the housing.

In the above-described vehicle lamp including the projector headlight, the contrasting and tonal differences between the horizontal cut-off line for the oncoming lane and the driving lane can become clear and the contrasting difference between the upper and lower sides of the horizontal cut-off line can maintain clear. In addition, the horizontal cut-off line of the light distribution pattern can be adjusted with the screws in both directions of the optical axis. Thus, the disclosed subject matter can provide a vehicle lamp including a projector headlight in which the light distribution pattern is easily adjusted.

BRIEF DESCRIPTION OF THE DRAWINGS

These and other characteristics and features of the disclosed subject matter will become clear from the following description with reference to the accompanying drawings, wherein:

FIGS. 8(A) and (B) are enlarged cross-section views depicting both the top edge line 3a and a top surface 3a1 of the shade along line C-C shown in FIG. 2 and both the top edge line 3b and a top surface 3b1 of the shade along line D-D shown in FIG. 2, respectively;

FIG. 9 is a schematic overview showing a relation between the projector lens, a focus curve FL and the top edge lines 3a-3b of the shade shown in FIG. 2;

FIGS. 18(A) and (B) are schematic overviews depicting the top edge line 3a of the shade in order to explain an effect associated with a thickness of top surface 3a1, wherein the thickness W1" shown in FIG. 18(A) is thinner than the thickness W1 shown in FIG. 18(B);

FIG. 19 is a schematic diagram showing a light distribution pattern for further explanation of the lighting effect associated with the thickness of the top surface 3a1 in FIGS. 18(A) and (B);

DETAILED DESCRIPTION OF EXEMPLARY EMBODIMENTS

Figure 1:
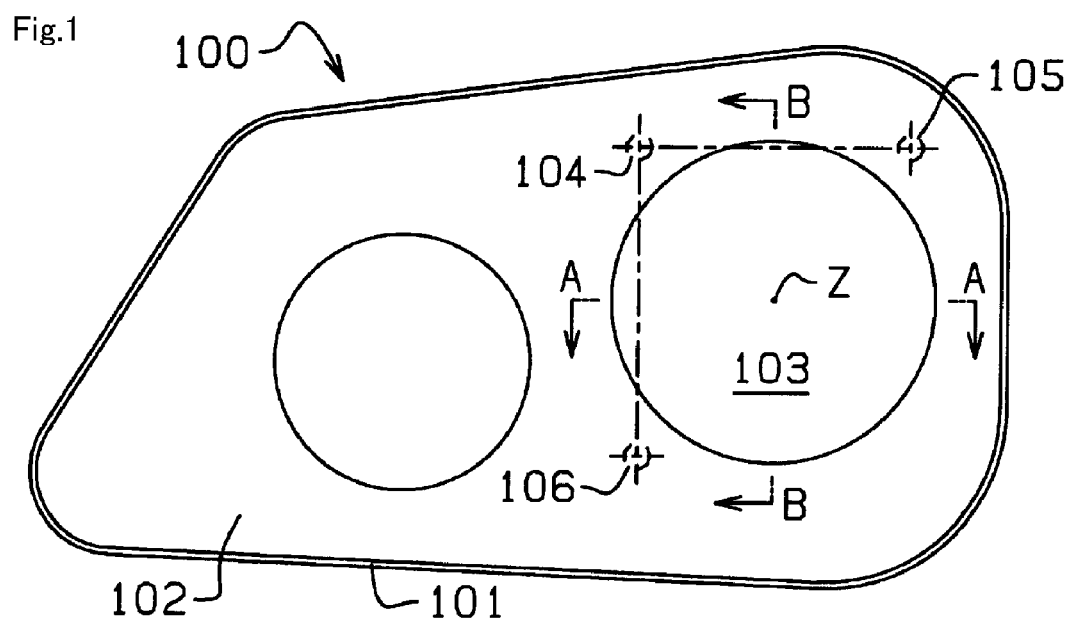
FIG. 1 is a front view showing an exemplary embodiment of a vehicle lamp including a projector headlight for a low beam made in accordance with principles of the disclosed subject matter.

The disclosed subject matter will now be described in detail with reference to FIGS. 1 to 19. FIG. 1 is a front view showing an exemplary embodiment of a vehicle lamp 100 including a projector headlight 103 for a low beam made in accordance with principles of the disclosed subject matter. The vehicle lamp 100 shown in FIG. 1 is a vehicle headlight that includes a housing 101, an outer lens 102 and the projector headlight 103 for a low beam.

In addition, the vehicle lamp can include a fulcrum point 104 based on the housing 101 such that it can be revolved when adjusting a light distribution pattern thereof, a screw 105 for revolving portions of the lamp in a horizontal direction with respect to an optical axis as described in more detail later in order to make adjustments in a horizontal direction of the light distribution pattern, and a screw 106 for revolving portions of the lamp in a vertical direction with respect to the optical axis Z in order to make adjustments in a vertical direction of the light distribution pattern.

Figure 2:
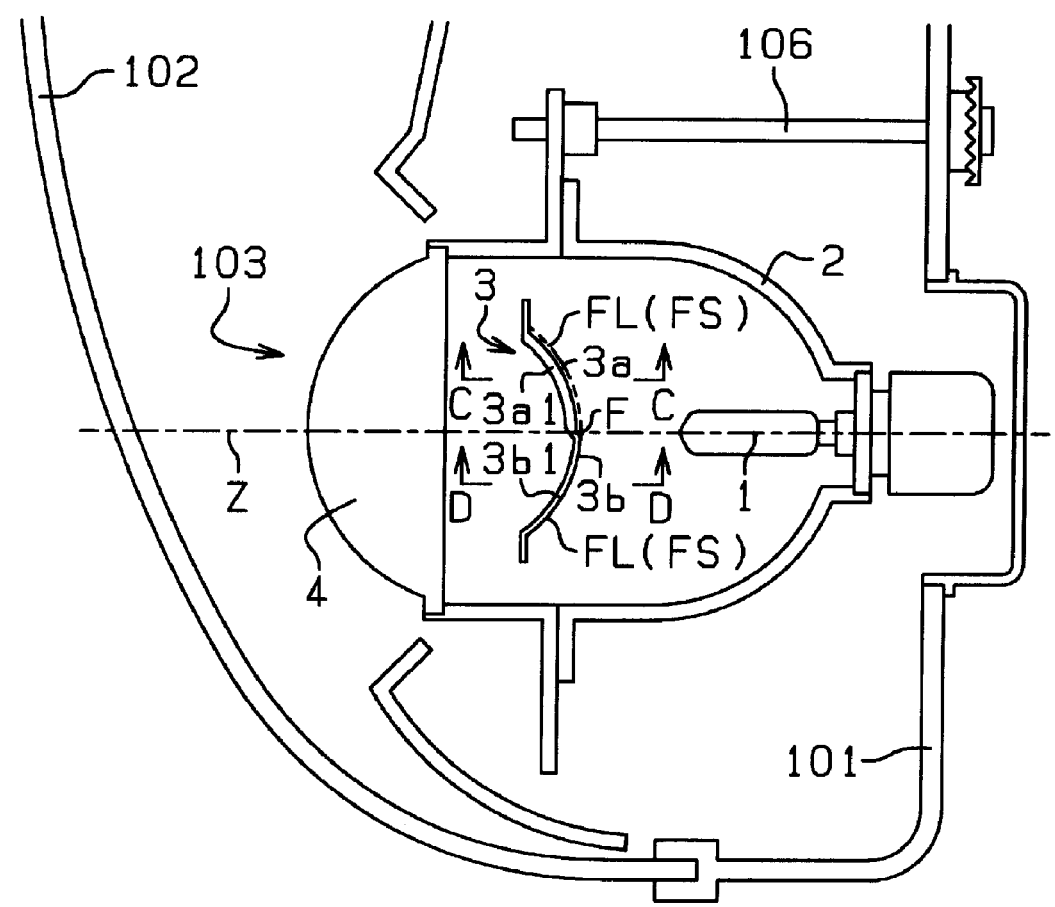
FIG. 2 is a cross-section top view showing the projector headlight along line A-A shown in FIG. 1.
Figure 3:
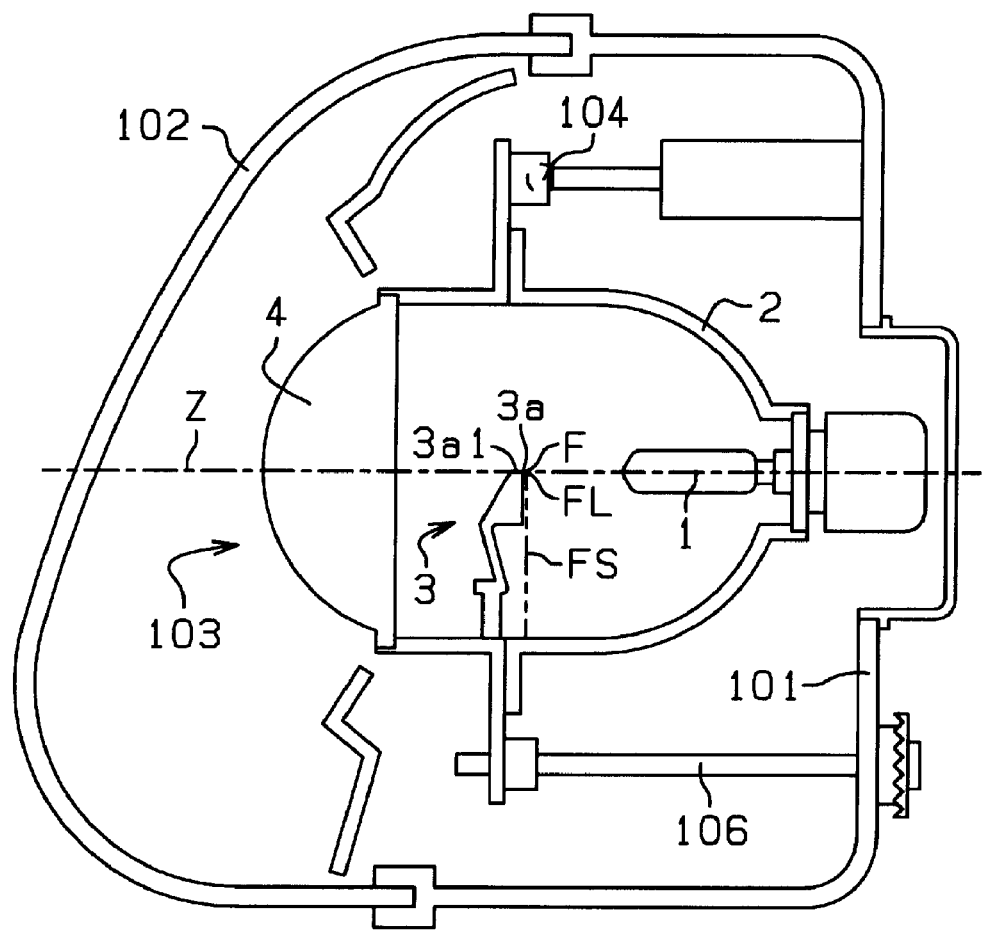
FIG. 3 is a cross-section side view showing the projector headlight along line B-B shown in FIG. 1.

FIG. 2 is a cross-section top view showing the projector headlight 103 along line A-A shown in FIG. 1, wherein the line A-A is a horizontal line including the optical axis Z. FIG. 3 is a cross-section side view showing the projector headlight 103 along line B-B shown in FIG. 1, wherein the line B-B is a vertical line including the optical axis Z. A light source 1 can be an arbitrary light source, such as HID lamp (high intensity discharge lamp), halogen bulb, LED, combinations thereof, etc.

A reflector 2 can be configured with at least one ellipsoidal reflex surface, in that a first focus thereof can be located near the light source 1 and a second focus thereof can be located near a focus F of a projector lens 4. Thus, the above-described optical axis Z can substantially correspond to each optical axis of the projector lens 4, the light source 1 and reflector 2 connecting the first focus thereof to the second focus thereof. Light emitted from the light source 1 can be illuminated in a forward direction of the projector headlight 103 via the projector lens 4.

When the projector headlight 103 is used in low beam mode using the above-described structure, the projector headlight 103 can include a shade 3 in order to shield an upward light that may give a glaring type light to an incoming car and the like. Top edge 3a of the shade 3 shows a top edge line configured to form a horizontal cut-off line of an oncoming lane and top surface 3a1 of the shade 3 shows a top surface including the top edge line 3a. A top edge line 3b of the shade 3 can be configured to form a horizontal cut-off line for a driving lane and is connected to the top edge line 3a. A top surface 3b1 including the top edge line 3b also connects with the top surface 3a1.

Thus, a neutral point between the top edge line 3a and 3b can be located near the focus of the projector lens 4. The horizontal focus curve FL is described above in paragraphs [0006]-[0007] and vertical surface FS includes the horizontal focus curve FL. Their relationship to and operations with respect to the shade 3 will be described in detail later.

Figure 4:
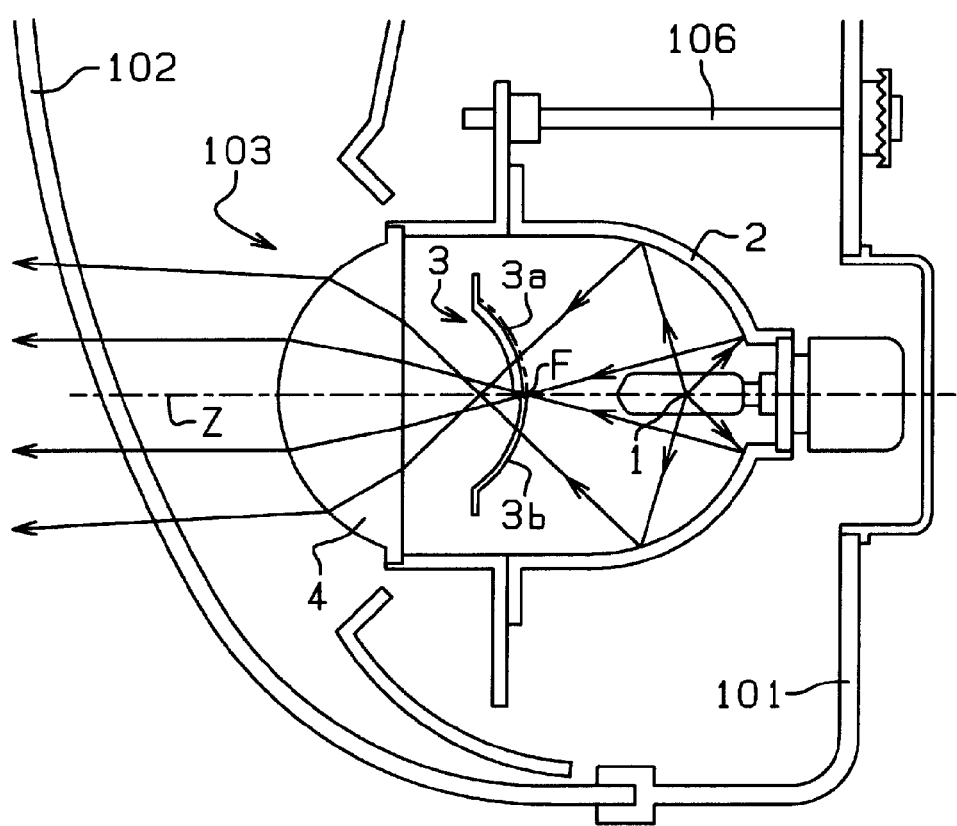
FIG. 4 is a cross-section top view showing fundamental light paths on the horizontal surface including the optical axis in the projector headlight shown in FIG. 2.
Figure 5:
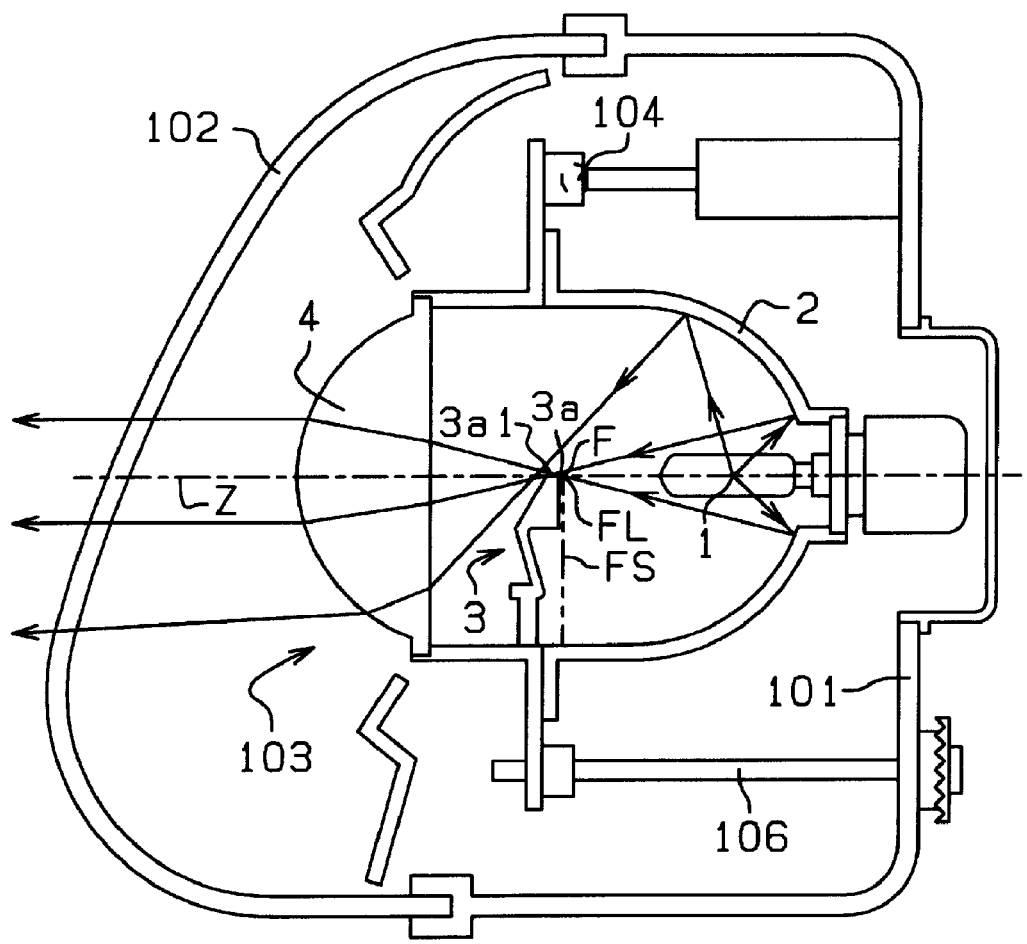
FIG. 5 is a cross-section side view showing fundamental light paths on the vertical surface including the optical axis in the projector headlight shown in FIG. 3.

FIG. 4 is a cross-section top view showing fundamental light paths on a horizontal surface including the optical axis Z for the projector headlight 103 shown in FIG. 2. FIG. 5 is a cross-section side view showing fundamental light paths on a vertical surface including the optical axis Z for the projector headlight 103 shown in FIG. 3. In addition, FIG. 6 is a schematic diagram showing a fundamental light distribution pattern P formed by the projector headlight 103 for a low beam made in accordance with principles of the disclosed subject matter.

Figure 6:
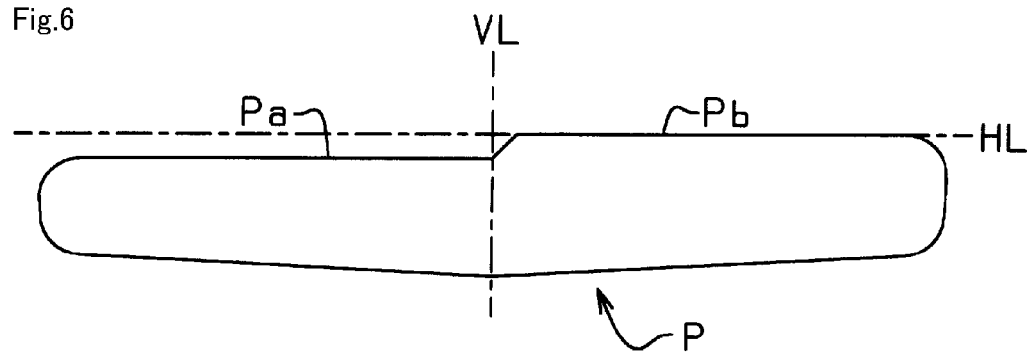
FIG. 6 is a schematic diagram showing a fundamental light distribution pattern formed by the projector headlight for a low beam made in accordance with principles of the disclosed subject matter.

In FIG. 6, reference HL shows a horizontal line and reference VL shows a vertical line. Reference Pa depicts a horizontal cut-off line on a side of an oncoming lane in the light distribution pattern P and reference Pb depicts a horizontal cut-off line on a side of a driving lane in the light distribution pattern P. As shown in FIGS. 4-5, the top edge line 3a of the shade 3 can have horizontal cut-off line Pa formed on the side of an oncoming lane, and the top edge line 3b of the shade 3 can have the horizontal cut-off line Pb formed on the side of a driving lane in the light distribution pattern P shown in FIG. 6.

The light distribution pattern P can be formed by the projector headlight 103. However, when the projector headlight 103 is attached to the housing 101 and/or the vehicle lamp 100 is attached to a vehicle, the light distribution pattern P may be in error with reference to the HL-axis and the VL-axis due to a fabrication or manufacturing error. In this case, the light distribution pattern P can be adjusted in the horizontal direction of the optical axis Z using the screw 105 and in the vertical direction thereof using the screw 106, respectively.

Figure 7:
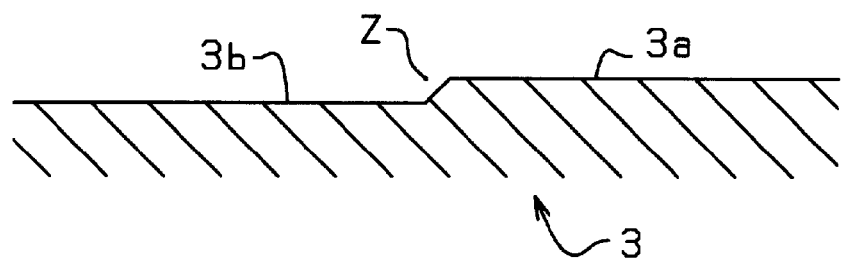
FIG. 7 is an enlarged front view depicting a portion near a top edge line 3a-3b of a shade in a rightward direction of FIG. 2.
Figure 10:
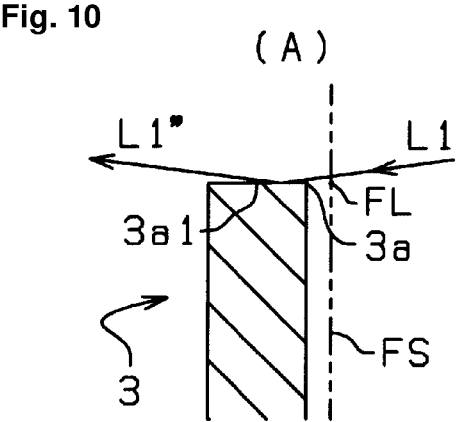
FIGS. 10(A) and (B) are schematic overviews depicting the top surfaces 3a1 of the shade in order to explain an effect associated with an angle θ1 of the top surface 3a1, wherein the angle θ1 is 0 degree in FIG. 10(A) and the angle θ1 is approximately 2 degrees in FIG. 10(B)
Figure 10:
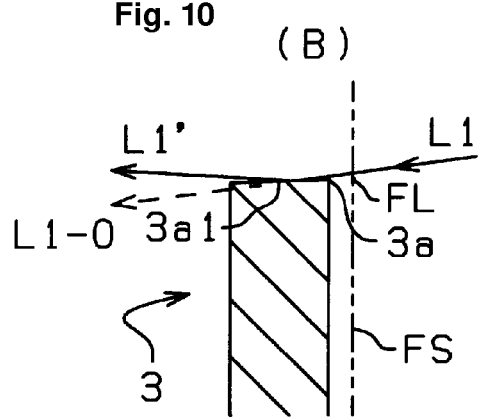

FIG. 7 is an enlarged front view depicting a portion near the top edge line 3a-3b of the shade 3 in a rightward direction of FIG. 2. FIG. 8(A) is an enlarged cross-section view depicting both the top edge line 3a and the top surface 3a1 of the shade 3 along line C-C shown in FIG. 2, wherein the line C-C is parallel to the optical axis Z. FIG. 8(B) is an enlarged cross-section view depicting both the top edge line 3b and the top surface 3b1 of the shade 3 along line D-D shown in FIG. 2, wherein the line D-D is parallel to the optical axis Z. In addition, FIG. 9 is a schematic overview showing a relation between the projector lens 4, the horizontal focus curve FL and the top edge line 3a-3b of the shade 3 shown in FIG. 2.

In the projector headlight 103 for low beam of the disclosed subject matter, the top surface 3a1 of the shade 3 can be slanted down in a direction towards the projector lens 4 at an angle $\theta 1$ (>0 degree), for example, approximately 2 degrees to the optical axis as shown in FIG. 8(A). The top surface 3b1 of the shade 3 can also be slanted down in a direction towards the projector lens 4 at $\theta 2$ (>$\theta 1$), for example, approximately 8 degrees to the optical axis as shown in FIG. 8(B). In addition, a thickness W1 of top surface 3a1 of the shade 3 can be wider than a thickness W2 of top surface 3b1.

Furthermore, the top edge line 3b of the shade 3 can be located near the horizontal focus curve FL of the projector lens 4 along with the top edge line 3a. The vertical surface including the top edge line 3b can also be located near the focus vertical surface FS including the horizontal focus curve FL as shown in FIGS. 8(B) and 9.

However, the top edge line 3a of the shade 3 can be located along a position, for instance, approximately 0.5 millimeters nearer in a direction towards the projector lens 4 than the horizontal focus curve FL of the projector lens 4. Similarly, the vertical surface including the top edge line 3a can be located along a position, for instance, approximately 0.5 millimeters nearer in a direction towards the projector lens 4 than the focus vertical surface FS including the focus curve FL as shown in FIGS. 8(A) and 9.

That is to say, each point on the top edge line forming the horizontal cut-off line of the oncoming lane can be nearer in a direction towards the projector lens than each symmetrical point on the top edge line forming the horizontal cut-off line of the driving lane based on the neutral point. The effect will be described in more detail later.

FIGS. 10(A) and (B) are schematic overviews depicting the top surfaces 3a1 of the shade 3 in order to explain an effect associated with an angle θ1 of the top surface 3a1, wherein the angle θ1 is 0 degree in FIG. 10(A) and the angle θ1 is, for example, approximately 2 degrees in FIG. 10(B). Reference L1 shows an incoming light on the top surface 3a1 of the shade 3, and reference L1" shows a reflex or reflected light reflected on the top surface 3a1 shown in FIG. 10(A). Reference L1' shows a reflex light reflected on the top surface 3a1 shown in FIG. 10(B). In this case, if the incoming light L1 cannot be reflected on the top surface 3a1 and can pass through the shade 3 as shown as a dotted line in FIG. 10(B), the transmitted light is shown as reference L1-0.

When comparing the above-described three lights L1", L1' and L1-0, the reflex light L" can illuminate the highest position among the three light paths and the transmitted light L1-0 can illuminate the lowest position among the three light paths. In the fundamental light distribution pattern P shown in FIG. 6, the positions illuminated by the three light paths are shown and will now be described in more detail.

Figure 11:
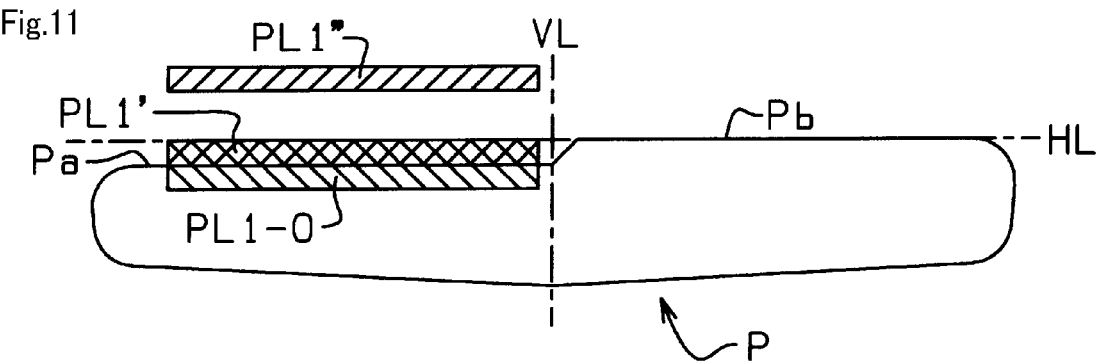
FIG. 11 is a schematic diagram showing a light distribution pattern for further explanation of the lighting effect associated with an incoming light shown in FIGS. 10(A) and (B)

FIG. 11 is a schematic diagram showing a light distribution pattern for further explanation of effect associated with an incoming light L1 shown in FIGS. 10(A) and (B) using the fundamental light distribution pattern P shown in FIG. 6. References PL1-0, PL1' and PL1" shown in FIG. 11 show positions illuminated by the above-described three lights L1-0, L1' and L1", respectively.

If the incoming light L1 cannot be reflected on the top surface 3a1 and can pass through the shade 3, the transmitted light L1-0 can illuminate the position PL1-0, which is located underneath the horizontal cut-off line Pa on the side of oncoming lane in the light distribution pattern P as shown in FIG. 11. However, because the incoming light L1 can be reflected on the top surface 3a1 of the shade 3 as shown in FIG. 10(B), the transmitted light L1-0 can become the reflex light L1' and therefore the transmitted light L1-0 may not actually exist. Thus, the portion PL1-0 underneath the horizontal cut-off line Pa on the side of oncoming lane in the light distribution pattern P can become dark.

When the angle θ1 of the top surface 3a1 of the shade 3 is 0 degree as shown in FIG. 10(A), the reflex light L1" can illuminate the position PL1" above the horizontal cut-off line Pa on the side of an oncoming lane in the light distribution pattern P. Because an incoming angle basically equals a reflex angle, the reflex light L1" reflected on the horizontal surface can illuminate the position PL1" which is located above the horizontal cut-off line Pa on the side of an oncoming lane in the light distribution pattern P.

However, when the angle θ1 of the top surface 3a1 of the shade 3 is, for example, 2 degrees as shown in FIG. 10(B), the reflex light L1' reflected on the top surface 3a1 can illuminate the position PL1', which is located on the horizontal cut-off line Pa of the oncoming lane in the light distribution pattern P as shown in FIG. 11. Thus, the portion PL1' on the horizontal cut-off line Pa of the oncoming lane in the light distribution pattern P can become brighter and possibly as bright as the reflex light L1'.

According to the projector headlight 103 for low beam as described above, the portion PL1-0 underneath the horizontal cut-off line Pa on the side of an oncoming lane in the light distribution pattern P can become darker than that of the projector headlight using the conventional structure. In addition, the portion PL1' on the horizontal cut-off line Pa of the oncoming lane in the light distribution pattern P can become brighter than that of the projector headlight using the conventional structure.

Thus, the contrasting difference between the upper and lower sides of the horizontal cut-off line Pa on the side of an oncoming lane in the light distribution pattern P can be reduced and therefore the horizontal cut-off line of the oncoming lane can include a thin blur part.

Figure 12:
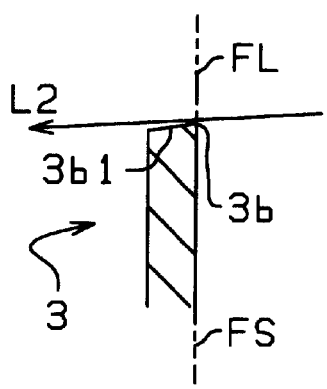
FIG. 12 is a schematic overview depicting the top surface 3b1 of the shade in order to explain an effect associated with an angle θ2 of the top surface 3b1, wherein the angle θ2 is larger than the angle θ1 of the top surface 3a1.
Figure 13:
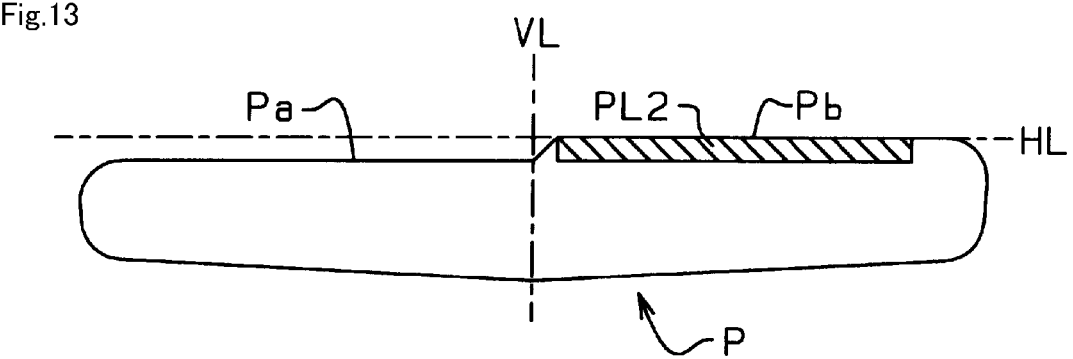
FIG. 13 is a schematic diagram showing a light distribution pattern for further explanation of the lighting effect of the top surface 3b1 shown in FIG. 12.
Figure 14:
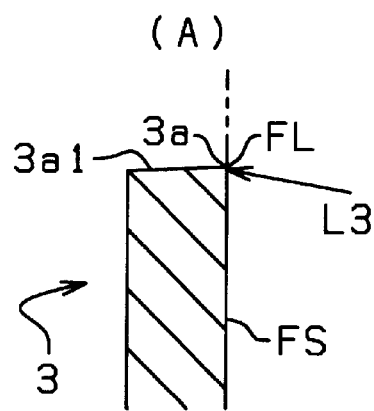
FIGS. 14(A) and (B) are schematic overviews depicting the top edge line 3a of the shade in order to explain an effect associated with the position of the top edge line 3a, wherein the top edge line 3a corresponds to the focus curve FL in FIG. 14(A) and the top edge line 3a is approximately 0.5 millimeters away from the focus curve FL in FIG. 14(B)
Figure 14:
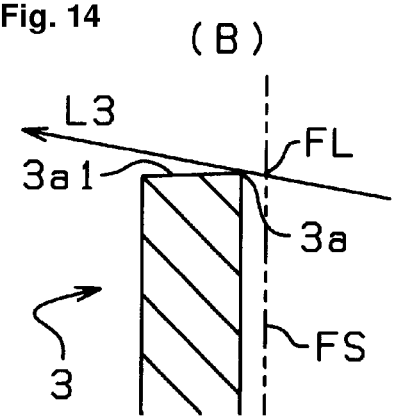

FIG. 12 is a schematic overview depicting the top surface 3b1 of the shade 3 in order to explain an effect associated with an angle θ2 of the top surface 3b1, wherein the angle θ2 is larger than the angle θ1 of the top surface 3a1. FIG. 13 is a schematic diagram showing a light distribution pattern for further explanation of the effect of the top surface 3b1 shown in FIG. 12 using the fundamental light distribution pattern P shown in FIG. 6.

A reflex light L2 reflected on the top surface 3b1 shown in FIG. 12 can illuminate a position PL2 underneath the horizontal cut-off line Pb on a side of a driving lane in the light distribution pattern P shown in FIG. 13. The light distribution pattern of the position PL2 formed by the top surface 3b1 can basically include two light distribution patterns corresponding to each light distribution pattern of both positions PL1' and PL1-0 formed by the top surface 3a1 as shown in FIG. 11.

Thus, according to the angle θ2 of the top surface 3b1 and 11 and the thickness W2 of the top surface 3b1, the position PL2 underneath the horizontal cut-off line Pb on the side of the driving lane in the light distribution pattern P can become darker than that of the projector headlight using the conventional structure.

Therefore, the contrasting difference between the upper and lower sides of the horizontal cut-off line Pb on the side of the driving lane in the light distribution pattern P can also be reduced so as to conform to a light distribution standard for a headlight. The horizontal cut-off line of the driving lane can include a thinner and clearer blur part than that of the oncoming lane.

However, because the angle θ2 of the top surface 3b1 is larger than the angle θ1 of the top surface 3a1 and the thickness W2 thereof is thinner than the thickness W1 of the top surface 3b1, the light distribution pattern of the position PL2 can be thinner in a vertical direction than that of both positions PL1' and PL1-0 and can be clearer than that of both positions PL1' and PL1-0.

Consequently, according to the angle difference between the angle θ2 of the top surface 3b1 and the angle θ1 of the top surface 3a and the thick difference between the thickness W2 of the top surface 3b1 and the thickness W1 of the top surface 3a, the contrasting and tonal differences between the horizontal cut-off line Pa and Pb can become clearer than that of the projector headlight using the conventional structure.

In addition, because the portion PL2 underneath the horizontal cut-off line Pb of the driving lane in the light distribution pattern P can be maintained nearly clear, the contrasting difference between the upper and lower sides of the horizontal cut-off line can be maintained clear. Thus, the adjustment of the light distribution pattern in the projector headlight 103 can become easier than that in the projector headlight using the conventional structure.

The top edge line 3a of the shade 3 can extend along and be located at, for instance, positions approximately 0.5 millimeters nearer in a direction towards the projector lens 4 than the horizontal focus curve FL of the projector lens 4. The vertical surface including the top edge line 3a can also extend along and be located, for instance, approximately 0.5 millimeters nearer in a direction towards the projector lens 4 than the focus vertical surface FS including the horizontal focus curve FL as shown in FIGS. 8(A) and 9. The effect of this structure will now be described in more detail.

FIG. 14(A) is a schematic overview depicting the top edge line 3a of the shade 3 in order to explain an effect associated with the position of the top edge line 3a, wherein the top edge line 3a corresponds to the focus curve FL and the vertical surface including the top edge line also corresponds to the vertical focus surface FS. FIG. 14(B) is a schematic overview depicting both the top edge line 3a and the vertical surface including the top edge line 3a, which are approximately 0.5 millimeters away from the focus curve FL and the vertical focus surface FS, respectively.

In this case, a reflex light L3 can pass through the shade 3 as a reflex light reflected from the reflector 2 because the vertical surface of the shade 3 is closer in a direction toward the projector lens 4 than the vertical focus surface FS as shown in FIG. 14(B). However, the reflex light L3 cannot pass through the shade 3 because the vertical surface of the shade 3 corresponds to the vertical focus surface FS including the horizontal focus curve FL as shown in FIG. 14(A).

Figure 15:
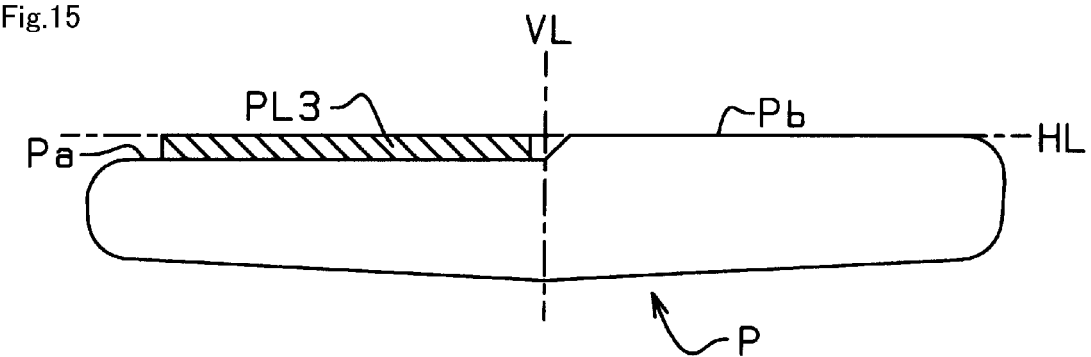
FIG. 15 is a schematic diagram showing a light distribution pattern for further explanation of the lighting effect associated with positions of the top edge line 3a shown in FIGS. 14(A) and (B)
Figure 16:
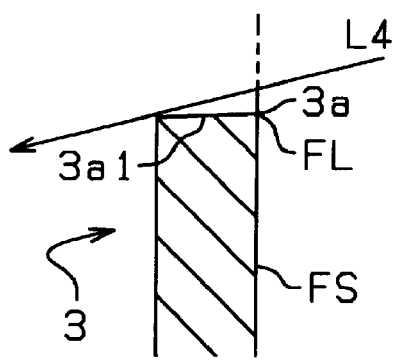
FIGS. 16(A) and (B) are schematic overviews depicting the top edge line 3a of the shade in order to explain another effect associated with a position of the top edge line 3a, wherein the top edge line 3a corresponds to the focus curve FL in FIG. 16(A) and the top edge line 3a is approximately 0.5 millimeters away from the focus curve FL in FIG. 16(B)
Figure 16:
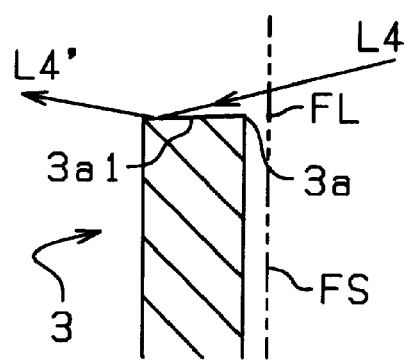

FIG. 15 is a schematic diagram showing a light distribution pattern for further explanation of an effect associated with positions of the top edge line 3a shown in FIGS. 14(A) and (B) using the fundamental light distribution pattern shown in FIG. 6. The above-described reflex light L3 can illuminate a position PL3 on the horizontal cut-off line Pa of the oncoming lane in the light distribution pattern P shown in FIG. 15.

The reflex light L3 can include an upwards light but not a reflex light reflected on the top surface 3a1 of the shade 3. Thus, the position PL3 on the horizontal cut-off line Pa of the oncoming lane in the light distribution pattern P may become brighter by locating the shade 3 at a position closer in a direction towards the projector lens 4.

FIGS. 16(A) and (B) are schematic overviews depicting the top edge line 3a of the shade 3 in order to explain other effects associated with the position of the top edge line 3a, wherein the top edge line 3a corresponds to the focus curve FL in FIG. 16(A) and the top edge line 3a is approximately 0.5 millimeters away from the focus curve FL in FIG. 16(B);

In this case, a reflex light L4" can be reflected on the top surface 3a1 of the shade 3 from a reflex light L4 reflected from the reflector 2 because the vertical surface including the top edge line 3a of the shade 3 is closer in a direction toward the projector lens 4 than the vertical focus surface FS as shown in FIG. 16(B). However, as shown in FIG. 14(A), the portion of reflex light cannot be reflected on the top surface 3a1 of the shade 3 in the reflex light L4 reflected from the reflector 2 because the vertical surface of the shade 3 corresponds to the vertical focus surface FS.

Figure 17:
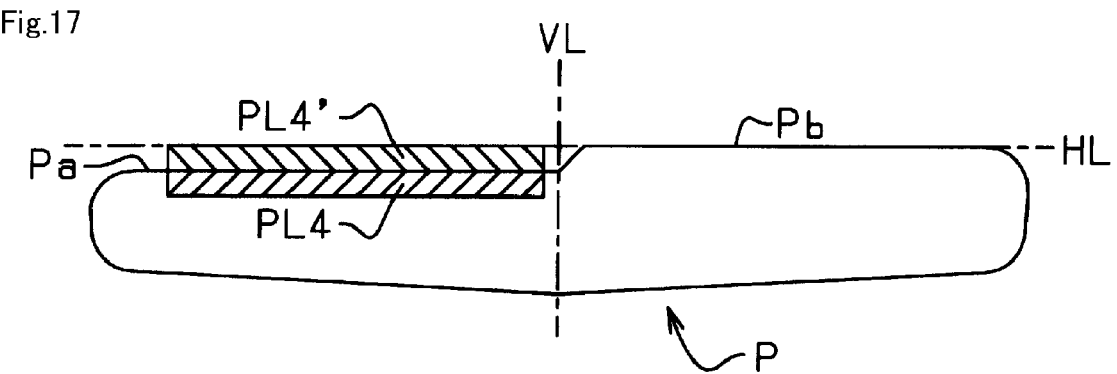
FIG. 17 is a schematic diagram showing a light distribution pattern for further explanation of the lighting effect associated with the positions of the top edge line 3a in FIGS. 16(A) and (B)
Figure 20A:
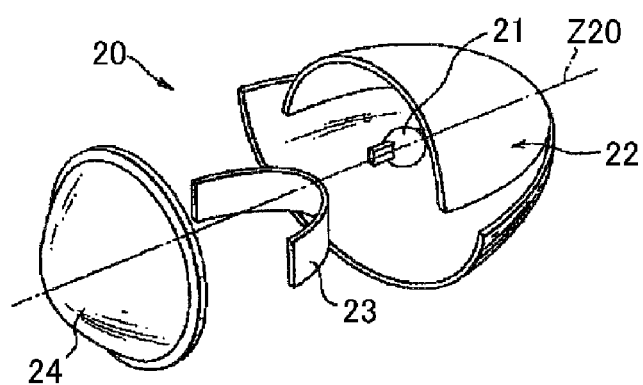
FIG. 20(A) is a perspective exploded diagram depicting a conventional projector headlight and FIG. 20(B) is a schematic diagram showing a fundamental light distribution pattern of the conventional projector headlight.
Figure 20B:
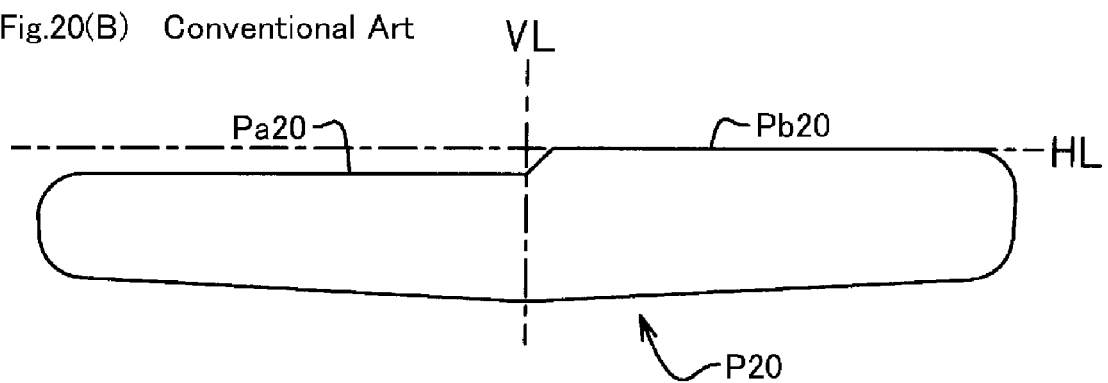
Figures 21A, 21B, 21C, 21D, 21E, 21F:
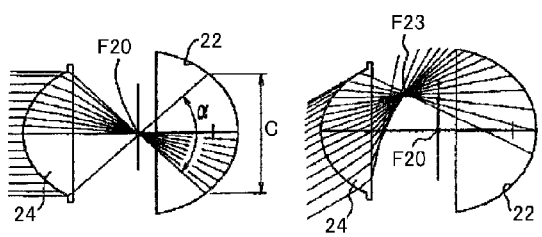
FIGS. 21A-E are schematic cross-section top views depicting different points or portions that make up a focus curve FL shown in FIG. 21F in relation to parallel rays emitted from the projector lens 24 via the reflector 22.
Figure 22:
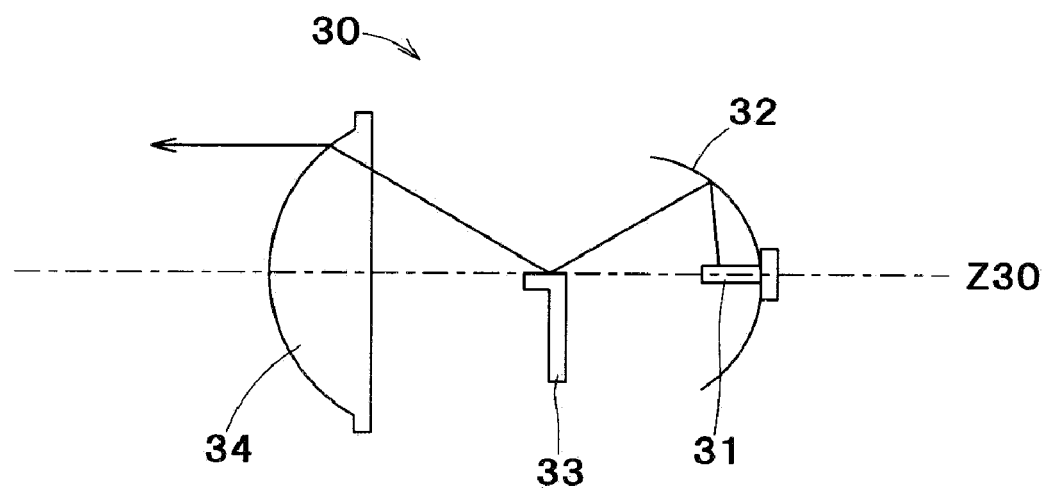
FIG. 22 is a schematic side cross-section view depicting the conventional projection headlight using a top surface of a shade.
Figure 23A:
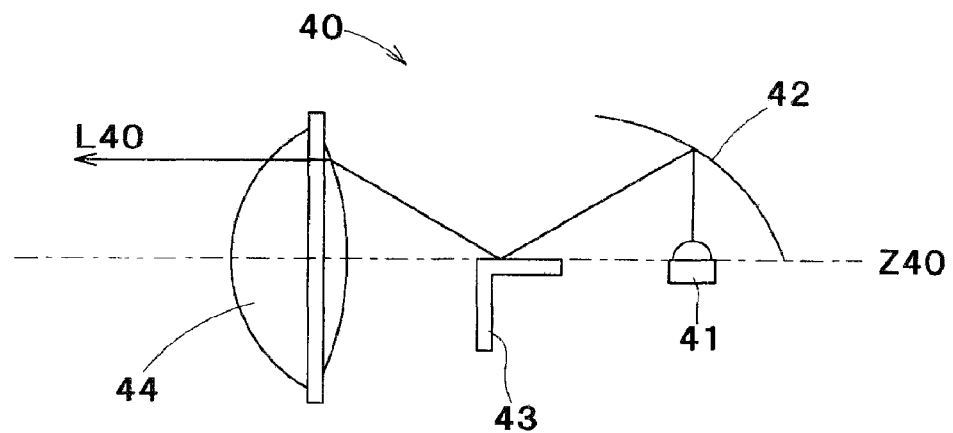
FIG. 23(A) is a schematic side cross-section view depicting another conventional projection headlight using a top surface of a shade and FIG. 23(B) is a schematic diagram showing a fundamental light distribution pattern for driving on the left side formed by the headlight of FIG. 23(A)
Figure 23B:
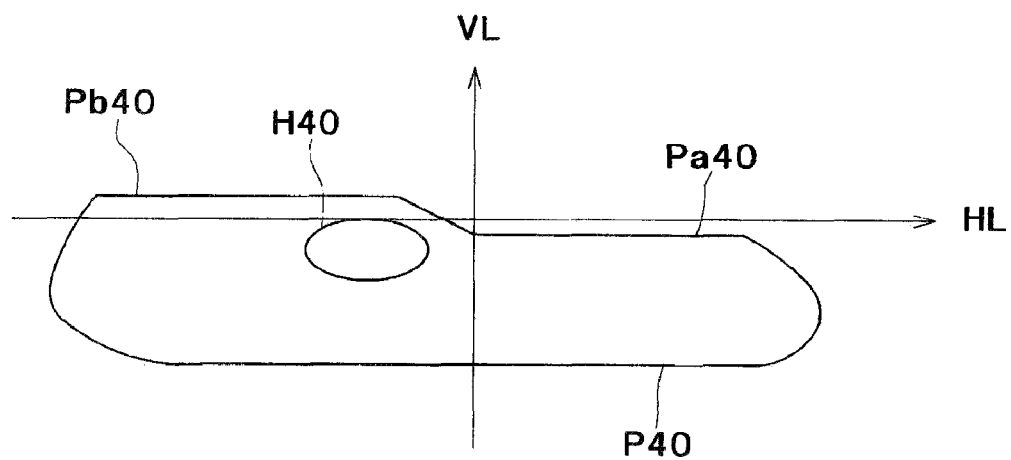
Figure 24A:
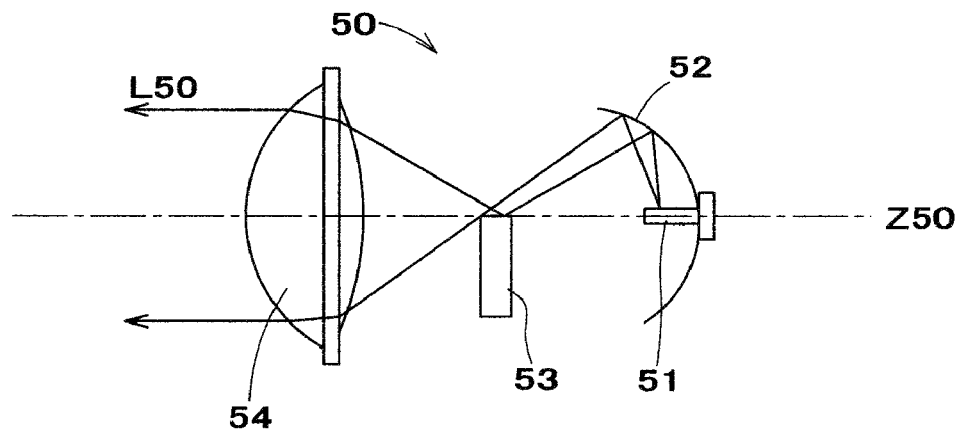
FIG. 24(A) is a schematic side cross-section view depicting yet another conventional projection headlight using a top surface of a shade and FIG. 24(B) is a schematic diagram showing a fundamental light distribution pattern for driving on the left side formed by the headlight of FIG. 24(A).
Figure 24B:
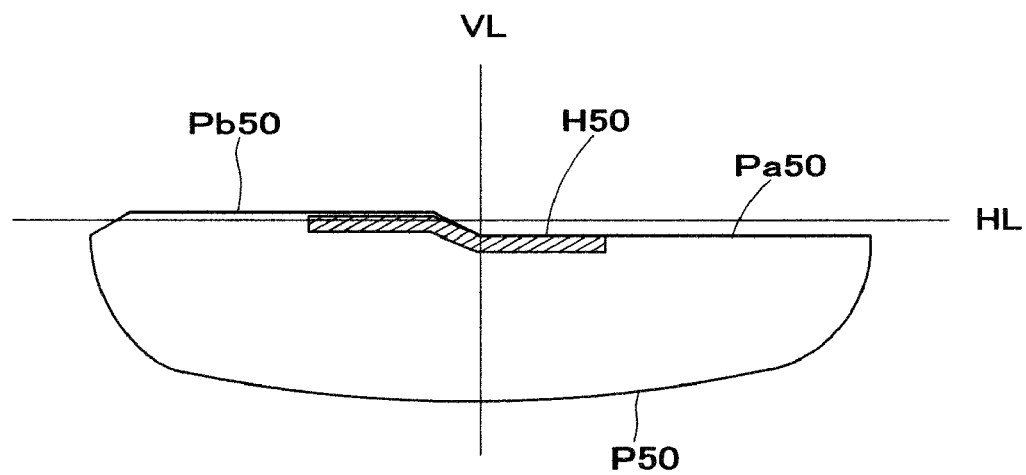

FIG. 17 is a schematic diagram showing a light distribution pattern for further explanation of the other effects associated with the positions of the top edge line 3a in FIGS. 16(A) and (B). The reflex light L4 can illuminate a position PL4" on the horizontal cut-off line Pa of the oncoming lane in the light distribution pattern P shown in FIG. 17. Thus, the position PL4" on the horizontal cut-off line Pa of the oncoming lane in the light distribution pattern P can become brighter. In addition, because the reflex light shielded by the shade 3 including the top surface 3a1 can be increased by locating the shade 3 at a closer position with respect to a direction towards the projector lens 4, a position PL4 underneath the horizontal cut-off line Pa of the oncoming lane in the light distribution pattern P shown in FIG. 17 can become darker.

Thus, the contrasting difference between the upper and lower sides of the horizontal cut-off line Pa on the side of an oncoming lane in the light distribution pattern P can be furthermore reduced in comparison with that of the projector headlight using the conventional structure. In addition, because the contrasting and tonal differences between the horizontal cut-off line Pa and Pb can become clearer than that of the projector headlight using the conventional structure, the adjustment of the light distribution pattern in the projector headlight 103 can become even easier than that in a projector headlight using the conventional structure.

FIGS. 18(A) and (B) are schematic overviews depicting the top edge line 3a of the shade 3 in order to explain an effect associated with a thickness of the top surface 3a1, wherein the thickness W1" shown in FIG. 18(A) is thinner than the thickness W1 shown in FIG. 18(B). As shown in FIGS. 18(A) and (B), a reflex light L5" can be reflected on the top surface 3a1 of the shade 3 from reflex light L5 reflected from the reflector 2 because the top surface 3a1 of the shade 3 is thick (W1). However, as shown in FIG. 18(B) there is a portion of the reflex light that is not reflected on the top surface 3a1 of the shade 3 from the reflex light L5 reflected from the reflector 2 when the top surface 3a1 is thin (W1').

FIG. 19 is a schematic diagram showing a light distribution pattern for further explanation of effects associated with the thickness of the top surface 3a1 in FIGS. 18(A) and (B). The reflex light L5 can illuminate a position PL5" on the horizontal cut-off line Pa for the oncoming lane in the light distribution pattern P shown in FIG. 19. Thus, the position PL5" on the horizontal cut-off line Pa for the oncoming lane in the light distribution pattern P can become brighter than that when using the thin top surface.

In addition, because the reflex light shielded by the shade 3 including the top surface 3a1 can be increased by thickening the top surface 3a1 of the shade 3, a position PL5 underneath the horizontal cut-off line Pa for the oncoming lane in the light distribution pattern P shown in FIG. 19 can become darker than that in case of the thin top surface.

As shown in FIGS. 8(A) and (B), the top surface 3b1 of the shade 3 can be thinner than the top surface 3a1 and the angle θ2 of the top surface 3b1 can be larger than the angle θ1 of the top surface 3a1. Thus, the position near the horizontal cut-off line Pb can be maintained relatively clear while the contrasting difference between the upper and lower sides of the horizontal cut-off line Pb on the side of the driving lane in the light distribution pattern P can be moderately reduced, and can even maintain the same brightness as the projector headlight using the conventional structure according to a design of the projector headlight.

Therefore, because the contrasting difference between the upper and lower sides of the horizontal cut-off line Pa of the driving lane in the light distribution pattern P can be clear and the contrasting and tonal differences between the horizontal cut-off line Pa and Pb can become clearer, the adjustment of the light distribution pattern in the projector headlight 103 can become easier.

According to the projector headlight, even when the light-emitting area of the projector headlight is reduced, the projector headlight can form a favorable light distribution pattern that can conform to a light distribution standard for a headlight. Thus, the above described vehicle lamp including the projector headlight for a low beam can provide a larger space for other structures and deign features, for example, other lamps, including a headlight for a high beam, a position lamp, etc.

Furthermore, after the projector headlight is attached to the housing of the vehicle lamp and the vehicle lamp including the projector headlight is attached to a vehicle, the adjustment of the favorable light distance pattern thereof can become easier than that in the conventional vehicle lamp. Thus, the disclosed subject matter can provide an excellent vehicle lamp including a projector headlight for a low beam with a favorable light distribution pattern.

Various modifications of the above disclosed embodiments can be made without departing from the spirit and scope of the presently disclosed subject matter. For example a headlight for a low beam can be structured by a plurality of small projector headlights using the above-described structure, which have respective different light distribution patterns.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A projector headlight, comprising:
    a light source;
    at least one ellipsoidal reflector having a first focus and a second focus, and the first focus located substantially at the light source;
    a projector lens having both a focus and an optical axis located substantially on an imaginary line connecting the first focus and the second focus of the at least one ellipsoidal reflector, and the focus of the projector lens being located substantially at the second focus of the at least one ellipsoidal reflector; and
    a shade having both a top edge line including a neutral point and a top surface including the top edge line, the neutral point being located substantially at the focus of the projector lens and configured to form a horizontal cut-off line for both a driving lane and an oncoming lane with light emitted from the light source, the top surface slanting down in a direction towards the projector lens, and wherein with respect to the optical axis a slant angle of the top surface including the top edge line forming the horizontal cut-off line for the driving lane is larger than a slant angle of the top surface including the top edge line forming the horizontal cut-off line for the oncoming lane.

2. The projector headlight according to claim 1, wherein a thickness of the top surface including the top edge line forming the horizontal cut-off line for the driving lane is thinner than a thickness of the top surface including the top edge line forming the horizontal cut-off line for the oncoming lane.

3. The projector headlight according to claim 1, wherein the top edge line substantially corresponds to a horizontal focus curve of the projector lens located at and intersecting with the optical axis at the focus of the projector lens.

4. The projector headlight according to claim 2, wherein the top edge line substantially corresponds to a horizontal focus curve of the projector lens located at and intersecting with the optical axis at the focus of the projector lens.

5. The projector headlight according to claim 1, wherein each point on the top edge line forming the horizontal cut-off line for the oncoming lane is closer to the projector lens than each symmetrical point on the top edge line forming the horizontal cut-off line for the driving lane wherein symmetry is based about the neutral point.

6. The projector headlight according to claim 2, wherein each point on the top edge line forming the horizontal cut-off line for the oncoming lane is closer to the projector lens than each symmetrical point on the top edge line forming the horizontal cut-off line for the driving lane wherein symmetry is based about the neutral point.

7. The projector headlight according to claim 3, wherein the top edge line forming the horizontal cut-off line for the oncoming lane is closer to the projector lens than the horizontal focus curve.

8. The projector headlight according to claim 4, wherein the top edge line forming the horizontal cut-off line for the oncoming lane is closer to the projector lens than the horizontal focus curve.

9. The projector headlight according to claim 7, wherein the top edge line forming the horizontal cut-off line for the oncoming lane is approximately 0.5 millimeters closer to the projector lens than the horizontal focus curve.

10. The projector headlight according to claim 8, wherein the top edge line forming the horizontal cut-off line for the oncoming lane is approximately 0.5 millimeters closer to the projector lens than the horizontal focus curve.

11. A vehicle lamp including the projector headlight according to claim 1, further comprising:
    a housing;
    a fulcrum point located in the housing and configured such that the projector headlight is revolvable about the fulcrum point;
    a first screw configured to rotate the projector headlight in a first direction about the fulcrum point and a second screw configured to rotate the projector headlight in a second direction about the fulcrum point, the first direction being substantially normal to the second direction; and
    an outer lens located adjacent the housing.

12. A vehicle lamp including the projector headlight according to claim 2, further comprising:
    a housing;
    a fulcrum point located in the housing and configured such that the projector headlight is revolvable about the fulcrum point;
    a first screw configured to rotate the projector headlight in a first direction about the fulcrum point and a second screw configured to rotate the projector headlight in a second direction about the fulcrum point, the first direction being substantially normal to the second direction; and
    an outer lens located adjacent the housing.

13. A vehicle lamp including the projector headlight according to claim 3, further comprising:
    a housing;
    a fulcrum point located in the housing and configured such that the projector headlight is revolvable about the fulcrum point;
    a first screw configured to rotate the projector headlight in a first direction about the fulcrum point and a second screw configured to rotate the projector headlight in a second direction about the fulcrum point, the first direction being substantially normal to the second direction; and
    an outer lens located adjacent the housing.

14. A vehicle lamp including the projector headlight according to claim 5, further comprising:
    a housing;
    a fulcrum point located in the housing and configured such that the projector headlight is revolvable about the fulcrum point;
    a first screw configured to rotate the projector headlight in a first direction about the fulcrum point and a second screw configured to rotate the projector headlight in a second direction about the fulcrum point, the first direction being substantially normal to the second direction; and an outer lens located adjacent the housing.

15. A vehicle lamp including the projector headlight according to claim 7, further comprising:
- a housing;
- a fulcrum point located in the housing and configured such that the projector headlight is revolvable about the fulcrum point;
- a first screw configured to rotate the projector headlight in a first direction about the fulcrum point and a second screw configured to rotate the projector headlight in a second direction about the fulcrum point, the first direction being substantially normal to the second direction; and
- an outer lens located adjacent the housing.

16. A projector headlight, comprising:
- a light source;
- at least one ellipsoidal reflector having a first focus and a second focus, the first focus located substantially at the light source;
- a projector lens having both a focus and an optical axis substantially located on an imaginary line connecting the first focus and the second focus of the at least one ellipsoidal reflector, and the focus of the projector lens being located substantially at the second focus of the at least one ellipsoidal reflector; and
- a shade located between the light source and the projector lens, the shade having a first side surface and a second side surface, the first side surface located closer to the light source than the second side surface, the shade including a top surface extending between the first side surface and the second side surface and forming a topmost edge line at a junction between the first side surface and the top surface, the topmost edge line extends along a first distance to define a driving lane portion of the topmost edge line and extends along a second distance to define an oncoming lane portion of the topmost edge line, the top surface including a driving lane portion extending from and including the driving lane portion of the topmost edge line and an oncoming lane portion extending from and including the driving lane portion of the topmost edge line, the top surface slanting down from the topmost edge line and in a direction towards the projector lens and away from the optical axis, wherein a first slant angle of the driving lane portion of the top surface with respect to the optical axis is larger than a second slant angle of the oncoming lane portion of the top surface with respect to the optical axis.

17. The projector headlight according to claim 16, wherein a thickness of the top surface extending in a first plane and from the second side surface to the driving lane portion of the topmost edge line is thinner than a thickness of the top surface extending in a second plane and from the second side surface to the oncoming lane portion of the topmost edge line, wherein the second plane is parallel with the first plane.

18. The projector headlight according to claim 16, wherein the topmost edge line substantially corresponds to a horizontal focus curve of the projector lens located at and intersecting with the optical axis at the focus of the projector lens.

19. The projector headlight according to claim 18, wherein the topmost edge line forming the horizontal cut-off line for the oncoming lane is closer to the projector lens than the horizontal focus curve.

20. The projector headlight according to claim 16, wherein the oncoming lane portion of the topmost edge line is located at and extends away from a neutral location which is located substantially at the focus of the projector lens, and the driving lane portion of the topmost edge line is located at and extends away from the neutral location and in a direction away from the oncoming lane portion of the topmost edge line, wherein each point on the oncoming lane portion of the topmost edge line is closer to the projector lens as compared to each symmetrical point on the driving lane portion of the topmost edge line, wherein symmetry is based about the neutral location.

* * * * *